US008355372B2

(12) United States Patent
 Abraham et al.

(10) Patent No.: US 8,355,372 B2
(45) Date of Patent: \*Jan. 15, 2013

(54) TRANSMISSION MODE AND RATE SELECTION FOR A WIRELESS COMMUNICATION SYSTEM

(75) Inventors: Santosh Abraham, San Diego, CA (US); Arnaud Meylan, San Diego, CA (US); Jay Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 12/463,078

(22) Filed: May 8, 2009

(65) Prior Publication Data
 US 2009/0290655 A1 Nov. 26, 2009

Related U.S. Application Data

(63) Continuation of application No. 11/101,086, filed on Apr. 6, 2005, now Pat. No. 7,564,814.

(60) Provisional application No. 60/569,201, filed on May 7, 2004.

(51) Int. Cl.
 *H04W 4/00* (2009.01)
(52) U.S. Cl. ...... 370/329; 370/335; 370/339; 455/67.13
(58) Field of Classification Search ........... 370/329, 370/200, 203, 208, 334, 335, 339; 342/367, 342/368; 375/260; 455/67, 13, 63.1, 92, 455/151.1, 562.1; 700/53, 46
See application file for complete search history.

(56) References Cited

U.S. PATENT DOCUMENTS

| 4,747,100 A | 5/1988 | Roach et al. |
| 4,750,171 A | 6/1988 | Kedar et al. |
| 5,081,623 A | 1/1992 | Ainscow et al. |

(Continued)

FOREIGN PATENT DOCUMENTS

EP 0475682 A2 3/1992

(Continued)

OTHER PUBLICATIONS

"TIA/EIA/IS-856 Standard" CDMA2000 High Rate Packet Data Air Interface Specification, Nov. 2000, (the IS-856 standard).

(Continued)

*Primary Examiner* — Shaima Q Aminzay
(74) *Attorney, Agent, or Firm* — Qualcomm Patent Group; Mary Fales; James H. Yancey, Jr.

(57) ABSTRACT

To select a transmission mode to use for a data transmission via a MIMO channel from station A to station B, station A obtains channel information used for spatial processing and determines the age of this information. Station A selects one of multiple transmission modes based on the age of the channel information and possibly other information (e.g., the fading characteristic of the MIMO channel). To select rate(s) to use for the data transmission, station A obtains channel state information (CSI) indicative of the received signal quality for the MIMO channel, e.g., received SNRs or "initial" rates. Station A determines the age of the CSI and selects one or more "final" rates based on the CSI, the age of the CSI, the selected transmission mode, and possibly other information. Station A processes data in accordance with the selected transmission mode and final rate(s) and transmits the processed data to station B.

10 Claims, 5 Drawing Sheets

U.S. PATENT DOCUMENTS

| | | | |
|---|---|---|---|
| 5,133,081 A | 7/1992 | Mayo et al. | |
| 5,276,703 A | 1/1994 | Budin et al. | |
| 5,280,476 A | 1/1994 | Kojima et al. | |
| 5,297,144 A | 3/1994 | Gilbert et al. | |
| 5,384,777 A | 1/1995 | Ahmadi et al. | |
| 5,444,702 A | 8/1995 | Burnett et al. | |
| 5,638,371 A | 6/1997 | Raychaudhuri et al. | |
| 5,677,909 A | 10/1997 | Heide et al. | |
| 5,684,791 A | 11/1997 | Raychaudhuri et al. | |
| 5,719,868 A | 2/1998 | Young et al. | |
| 5,729,542 A | 3/1998 | Dupont et al. | |
| 5,818,842 A | 10/1998 | Burwell et al. | |
| 5,923,650 A | 7/1999 | Chen et al. | |
| 5,970,059 A | 10/1999 | Ahopelto et al. | |
| 5,974,045 A | 10/1999 | Ohkura et al. | |
| 6,002,691 A | 12/1999 | Citta et al. | |
| 6,014,087 A | 1/2000 | Krishnakumar et al. | |
| 6,069,886 A | 5/2000 | Ayerst et al. | |
| 6,111,927 A | 8/2000 | Sokoler et al. | |
| 6,130,886 A | 10/2000 | Ketseoglou et al. | |
| 6,252,854 B1 | 6/2001 | Hortensius et al. | |
| 6,256,317 B1 | 7/2001 | Holloway et al. | |
| 6,307,846 B1 | 10/2001 | Willey | |
| 6,404,751 B1 | 6/2002 | Roark et al. | |
| 6,433,737 B2 | 8/2002 | Katz | |
| 6,438,104 B1 | 8/2002 | Fodor et al. | |
| 6,452,917 B1 | 9/2002 | Leung | |
| 6,456,599 B1 | 9/2002 | Elliott et al. | |
| 6,483,819 B1 | 11/2002 | Take et al. | |
| 6,504,506 B1 | 1/2003 | Thomas et al. | |
| 6,512,773 B1 | 1/2003 | Scott et al. | |
| 6,532,225 B1 | 3/2003 | Chang et al. | |
| 6,542,490 B1 | 4/2003 | Ahmadvand et al. | |
| 6,553,020 B1 | 4/2003 | Hughes et al. | |
| 6,563,816 B1 | 5/2003 | Nodoushani et al. | |
| 6,574,237 B1 | 6/2003 | Bullman et al. | |
| 6,580,704 B1 | 6/2003 | Wellig et al. | |
| 6,587,441 B1 | 7/2003 | Urban et al. | |
| 6,600,754 B1 | 7/2003 | Young et al. | |
| 6,609,866 B2 | 8/2003 | Huang et al. | |
| 6,611,525 B1 | 8/2003 | Natanson et al. | |
| 6,611,529 B1 | 8/2003 | Krishnakumar et al. | |
| 6,621,805 B1 | 9/2003 | Kondylis et al. | |
| 6,621,827 B1 | 9/2003 | Rezvani et al. | |
| 6,625,171 B1 | 9/2003 | Matsudo et al. | |
| 6,633,564 B1 | 10/2003 | Steer et al. | |
| 6,643,260 B1 | 11/2003 | Kloth et al. | |
| 6,671,511 B1 | 12/2003 | Forssell et al. | |
| 6,724,740 B1 | 4/2004 | Choi et al. | |
| 6,741,635 B2 | 5/2004 | Lo et al. | |
| 6,751,187 B2 | 6/2004 | Walton et al. | |
| 6,760,388 B2 | 7/2004 | Ketchum et al. | |
| 6,768,730 B1 | 7/2004 | Whitehill et al. | |
| 6,771,706 B2 | 8/2004 | Ling et al. | |
| 6,788,702 B1 | 9/2004 | Garcia-Luna-Aceves et al. | |
| 6,791,962 B2 | 9/2004 | Wentink et al. | |
| 6,791,996 B1 | 9/2004 | Watanabe et al. | |
| 6,795,409 B1 | 9/2004 | Youssefmir et al. | |
| 6,795,418 B2 | 9/2004 | Choi et al. | |
| 6,795,419 B2 | 9/2004 | Parantainen et al. | |
| 6,813,260 B1 | 11/2004 | Fogle et al. | |
| 6,847,626 B1 | 1/2005 | Carneal et al. | |
| 6,868,133 B2 | 3/2005 | Hicks et al. | |
| 6,898,441 B1 | 5/2005 | Kogiantis et al. | |
| 6,907,020 B2 | 6/2005 | Periyalwar et al. | |
| 6,912,225 B1 | 6/2005 | Kohzuki et al. | |
| 6,944,688 B1 | 9/2005 | Batcher et al. | |
| 6,961,311 B2 | 11/2005 | Rakotoarivelo et al. | |
| 6,963,549 B1 | 11/2005 | Jayaraman et al. | |
| 6,977,944 B2 | 12/2005 | Brockmann et al. | |
| 7,006,848 B2 | 2/2006 | Ling et al. | |
| 7,031,274 B2 | 4/2006 | Sherman | |
| 7,031,287 B1 | 4/2006 | Ho et al. | |
| 7,046,639 B2 | 5/2006 | Garcia-Luna-Aceves et al. | |
| 7,046,654 B2 | 5/2006 | Chen | |
| 7,046,690 B2 | 5/2006 | Sherman | |
| 7,058,074 B2 | 6/2006 | Ho et al. | |
| 7,065,144 B2 | 6/2006 | Walton et al. | |
| 7,068,633 B1 | 6/2006 | Ho | |
| 7,079,552 B2 | 7/2006 | Cain et al. | |
| 7,082,117 B2 | 7/2006 | Billhartz et al. | |
| 7,085,281 B2 | 8/2006 | Thomas et al. | |
| 7,092,737 B2 | 8/2006 | Horng et al. | |
| 7,095,732 B1 | 8/2006 | Watson, Jr. et al. | |
| 7,099,300 B2 | 8/2006 | Sugaya et al. | |
| 7,099,671 B2 | 8/2006 | Liang | |
| 7,116,652 B2 | 10/2006 | Lozano | |
| 7,123,627 B2 | 10/2006 | Kowalski et al. | |
| 7,130,289 B2 | 10/2006 | Kuan et al. | |
| 7,142,527 B2 | 11/2006 | Garcia-Luna-Aceves et al. | |
| 7,145,895 B2 | 12/2006 | Mueckenheim et al. | |
| 7,149,245 B2 | 12/2006 | Budka et al. | |
| 7,154,876 B2 | 12/2006 | Benveniste et al. | |
| 7,158,504 B2 | 1/2007 | Kadaba et al. | |
| 7,158,803 B1 | 1/2007 | Elliott | |
| 7,187,691 B2 | 3/2007 | Gavette et al. | |
| 7,203,192 B2 | 4/2007 | Desai et al. | |
| 7,206,083 B2 | 4/2007 | Shimada | |
| 7,236,459 B1 | 6/2007 | Okholm et al. | |
| 7,260,073 B2 | 8/2007 | Sipola | |
| 7,263,083 B2 | 8/2007 | Kisigami et al. | |
| 7,266,087 B2 | 9/2007 | Wahl et al. | |
| 7,269,152 B2 | 9/2007 | Vukovic et al. | |
| 7,274,707 B2 | 9/2007 | Choi et al. | |
| 7,277,149 B2 | 10/2007 | Kim et al. | |
| 7,277,419 B2 | 10/2007 | McGowan et al. | |
| 7,277,430 B2 | 10/2007 | Ono et al. | |
| 7,280,513 B2 | 10/2007 | Cao et al. | |
| 7,284,260 B2 | 10/2007 | Hilts et al. | |
| 7,301,924 B1 | 11/2007 | Gurbuz et al. | |
| 7,301,944 B1 | 11/2007 | Redmond et al. | |
| 7,313,104 B1 | 12/2007 | Kern et al. | |
| 7,330,877 B2 | 2/2008 | Kandala et al. | |
| 7,333,556 B2 | 2/2008 | Maltsev et al. | |
| 7,336,642 B2 | 2/2008 | Rich et al. | |
| 7,342,940 B2 | 3/2008 | Park | |
| 7,366,202 B2 | 4/2008 | Scherzer et al. | |
| 7,372,855 B2 | 5/2008 | Kandala | |
| 7,400,641 B2 | 7/2008 | Nitschke et al. | |
| 7,400,642 B2 | 7/2008 | Koo et al. | |
| 7,417,974 B2 | 8/2008 | Hansen et al. | |
| 7,440,573 B2 | 10/2008 | Lor et al. | |
| 7,450,550 B2 | 11/2008 | Jin et al. | |
| 7,512,070 B2 | 3/2009 | Stephens | |
| 7,525,994 B2 | 4/2009 | Scholte | |
| 7,564,814 B2 * | 7/2009 | Abraham et al. | 370/329 |
| 7,570,656 B2 | 8/2009 | Raphaeli et al. | |
| 7,599,340 B2 | 10/2009 | Chandra et al. | |
| 7,633,946 B2 | 12/2009 | Pavon et al. | |
| 7,639,657 B1 | 12/2009 | Ho et al. | |
| 7,676,236 B2 | 3/2010 | Nanda et al. | |
| 7,706,399 B2 | 4/2010 | Janczak | |
| 7,724,721 B2 | 5/2010 | Lim et al. | |
| 7,818,018 B2 | 10/2010 | Nanda et al. | |
| 7,869,432 B1 | 1/2011 | Mollyn | |
| 7,881,340 B2 | 2/2011 | Farrag et al. | |
| 7,894,538 B2 | 2/2011 | Walton et al. | |
| 2001/0024173 A1 | 9/2001 | Katz et al. | |
| 2001/0053141 A1 | 12/2001 | Periyalwar et al. | |
| 2001/0053695 A1 | 12/2001 | Wallentin | |
| 2002/0009999 A1 | 1/2002 | Lee et al. | |
| 2002/0021698 A1 | 2/2002 | Lee et al. | |
| 2002/0046257 A1 | 4/2002 | Killmer et al. | |
| 2002/0067736 A1 | 6/2002 | Garcia-Luna-Aceves et al. | |
| 2002/0071413 A1 | 6/2002 | Choi et al. | |
| 2002/0071449 A1 | 6/2002 | Ho et al. | |
| 2002/0093929 A1 | 7/2002 | Mangold et al. | |
| 2002/0110101 A1 | 8/2002 | Gopalakrishnan et al. | |
| 2002/0172186 A1 | 11/2002 | Larsson et al. | |
| 2002/0172217 A1 | 11/2002 | Kadaba et al. | |
| 2002/0191703 A1 | 12/2002 | Ling et al. | |
| 2003/0002605 A1 | 1/2003 | Lo et al. | |
| 2003/0003880 A1 | 1/2003 | Ling et al. | |
| 2003/0015611 A1 | 1/2003 | Teng et al. | |
| 2003/0043732 A1 | 3/2003 | Walton et al. | |
| 2003/0050084 A1 | 3/2003 | Damnjanovic et al. | |
| 2003/0063563 A1 | 4/2003 | Kowalski et al. | |

| | | |
|---|---|---|
| 2003/0072280 A1 | 4/2003 | McFarland et al. |
| 2003/0076797 A1 | 4/2003 | Lozano et al. |
| 2003/0087605 A1 | 5/2003 | Das et al. |
| 2003/0103525 A1 | 6/2003 | Wahl |
| 2003/0108117 A1 | 6/2003 | Ketchum et al. |
| 2003/0125040 A1 | 7/2003 | Walton et al. |
| 2003/0128684 A1 | 7/2003 | Hirsch et al. |
| 2003/0147385 A1 | 8/2003 | Montalvo et al. |
| 2003/0162519 A1 | 8/2003 | Smith et al. |
| 2003/0169763 A1 | 9/2003 | Choi et al. |
| 2003/0174645 A1 | 9/2003 | Paratainen et al. |
| 2003/0174680 A1 | 9/2003 | Kuan et al. |
| 2003/0198312 A1 | 10/2003 | Budka et al. |
| 2003/0202574 A1 | 10/2003 | Budka et al. |
| 2003/0223365 A1 | 12/2003 | Kowalski |
| 2003/0223418 A1 | 12/2003 | Desai et al. |
| 2004/0022213 A1 | 2/2004 | Choi et al. |
| 2004/0042556 A1 | 3/2004 | Medvedev et al. |
| 2004/0047319 A1 | 3/2004 | Elg et al. |
| 2004/0082356 A1 | 4/2004 | Walton et al. |
| 2004/0105386 A1 | 6/2004 | Sipola et al. |
| 2004/0109433 A1 | 6/2004 | Khan |
| 2004/0110538 A1 | 6/2004 | Doi |
| 2004/0120349 A1 | 6/2004 | Border et al. |
| 2004/0125778 A1 | 7/2004 | Lin et al. |
| 2004/0131019 A1 | 7/2004 | Kandala et al. |
| 2004/0141522 A1 | 7/2004 | Texerman et al. |
| 2004/0151199 A1 | 8/2004 | Sykes et al. |
| 2004/0156345 A1 | 8/2004 | Steer et al. |
| 2004/0156367 A1 | 8/2004 | Albuquerque et al. |
| 2004/0163129 A1 | 8/2004 | Chapman et al. |
| 2004/0204101 A1 | 10/2004 | Qiu et al. |
| 2004/0204104 A1 | 10/2004 | Horng et al. |
| 2004/0252664 A1 | 12/2004 | Cao et al. |
| 2004/0258039 A1 | 12/2004 | Stephens et al. |
| 2004/0258091 A1 | 12/2004 | Meyer et al. |
| 2004/0264504 A1 | 12/2004 | Jin et al. |
| 2004/0266451 A1 | 12/2004 | Stolyar et al. |
| 2005/0036475 A1 | 2/2005 | Nishiyama et al. |
| 2005/0047429 A1 | 3/2005 | Koo et al. |
| 2005/0053003 A1 | 3/2005 | Cain et al. |
| 2005/0053064 A1 | 3/2005 | Wang |
| 2005/0058078 A1 | 3/2005 | Jung et al. |
| 2005/0111462 A1 | 5/2005 | Walton et al. |
| 2005/0135284 A1 | 6/2005 | Nanda et al. |
| 2005/0135291 A1 | 6/2005 | Ketchum et al. |
| 2005/0135295 A1 | 6/2005 | Walton et al. |
| 2005/0135318 A1 | 6/2005 | Walton et al. |
| 2005/0135403 A1 | 6/2005 | Ketchum et al. |
| 2005/0135416 A1 | 6/2005 | Ketchum et al. |
| 2005/0152314 A1 | 7/2005 | Sun et al. |
| 2005/0152465 A1 | 7/2005 | Maltsev et al. |
| 2005/0239407 A1 | 10/2005 | Foore et al. |
| 2005/0270975 A1 | 12/2005 | Meylan et al. |
| 2006/0052088 A1 | 3/2006 | Pavon et al. |
| 2006/0092871 A1 | 5/2006 | Nishibayashi et al. |
| 2006/0099956 A1 | 5/2006 | Harada et al. |
| 2006/0164969 A1 | 7/2006 | Malik et al. |
| 2006/0165021 A1 | 7/2006 | Tian et al. |
| 2006/0165036 A1 | 7/2006 | Chandra et al. |
| 2006/0193294 A1 | 8/2006 | Jorswieck et al. |
| 2006/0227801 A1 | 10/2006 | Nanda et al. |
| 2006/0268886 A1 | 11/2006 | Sammour et al. |
| 2006/0274844 A1 | 12/2006 | Walton et al. |
| 2007/0037548 A1 | 2/2007 | Sammour et al. |
| 2007/0037564 A1 | 2/2007 | Imamura et al. |
| 2007/0058543 A1 | 3/2007 | Fenart et al. |
| 2007/0058605 A1 | 3/2007 | Meylan et al. |
| 2007/0230338 A1 | 10/2007 | Shao et al. |
| 2008/0130660 A1 | 6/2008 | Ros-Giralt et al. |
| 2009/0097444 A1 | 4/2009 | Lohr et al. |
| 2009/0103558 A1 | 4/2009 | Zangi et al. |
| 2009/0116434 A1 | 5/2009 | Lohr et al. |
| 2009/0252145 A1 | 10/2009 | Meylan et al. |
| 2009/0323646 A1 | 12/2009 | Ketchum et al. |
| 2010/0290423 A1 | 11/2010 | Hwang et al. |
| 2010/0309872 A1 | 12/2010 | Amini et al. |
| 2011/0223952 A1 | 9/2011 | Nanda et al. |

FOREIGN PATENT DOCUMENTS

| | | |
|---|---|---|
| EP | 1052855 A2 | 11/2000 |
| EP | 1089500 | 4/2001 |
| EP | 1182900 A1 | 2/2002 |
| EP | 1187406 A1 | 3/2002 |
| EP | 1261183 A1 | 11/2002 |
| EP | 1317110 A1 | 6/2003 |
| EP | 1463217 A1 | 9/2004 |
| JP | 2226828 | 10/1990 |
| JP | 2000174820 A | 6/2000 |
| JP | 2001024573 A | 1/2001 |
| JP | 2001160813 A | 6/2001 |
| JP | 2001160843 A | 6/2001 |
| JP | 2001507907 T | 6/2001 |
| JP | 2001217768 A | 8/2001 |
| JP | 2001522211 | 11/2001 |
| JP | 2003060655 A | 2/2003 |
| JP | 2003163669 A | 6/2003 |
| JP | 2003249939 A | 9/2003 |
| JP | 2003258807 A | 9/2003 |
| JP | 2003528507 A | 9/2003 |
| JP | 2003289309 A | 10/2003 |
| JP | 2003289576 A | 10/2003 |
| JP | 2005020163 A | 1/2005 |
| JP | 2005505148 T | 2/2005 |
| JP | 2005057373 A | 3/2005 |
| JP | 2005094156 A | 4/2005 |
| KR | 20030036847 | 5/2003 |
| KR | 20060090258 A | 8/2006 |
| KR | 20060090259 A | 8/2006 |
| TW | 550926 B | 9/2003 |
| TW | 200304292 | 9/2003 |
| TW | 567731 B | 12/2003 |
| TW | 200401549 | 1/2004 |
| WO | WO9625811 A1 | 8/1996 |
| WO | WO9905881 A1 | 2/1999 |
| WO | WO9957931 A1 | 11/1999 |
| WO | WO0056113 A1 | 9/2000 |
| WO | WO0064111 A1 | 10/2000 |
| WO | WO0119032 A1 | 3/2001 |
| WO | WO0128170 A2 | 4/2001 |
| WO | WO0171928 A2 | 9/2001 |
| WO | WO01072081 | 9/2001 |
| WO | 0176110 | 10/2001 |
| WO | WO0228119 A2 | 4/2002 |
| WO | WO0233582 A2 | 4/2002 |
| WO | WO0233852 A2 | 4/2002 |
| WO | WO02061969 A1 | 8/2002 |
| WO | WO02065664 A2 | 8/2002 |
| WO | WO02078211 A2 | 10/2002 |
| WO | WO02082751 A2 | 10/2002 |
| WO | WO02093843 A1 | 11/2002 |
| WO | WO02100064 A2 | 12/2002 |
| WO | WO03032526 A1 | 4/2003 |
| WO | WO03034619 A1 | 4/2003 |
| WO | WO03034642 A2 | 4/2003 |
| WO | WO03039074 A1 | 5/2003 |
| WO | WO03041297 A1 | 5/2003 |
| WO | WO03041343 A2 | 5/2003 |
| WO | WO03050968 A2 | 6/2003 |
| WO | 2004030287 | 4/2004 |
| WO | 2004038985 | 5/2004 |
| WO | WO2005039127 A1 | 4/2005 |
| WO | WO2005039133 A1 | 4/2005 |

OTHER PUBLICATIONS

3GPP2 TS 25.211: "Physical channels and mapping of transport channels onto physical channels (FDD)", Release 6, V.6.0.0, Dec. 2003.

3GPP2 TS 25.212: "Multiplexing and channel coding (FDD)", Release 5, V.510.0, Jun. 2005.

3GPP2 TS 25.213: "Spreading and modulation (FDD)", Release 5, V5.6.0, Jun. 2005.

3GPP2 TS 25.214: "Physical layer procedures (FDD)", Release 5, V5.11.0, Jun. 2005.

3GPP: "TIA/EIA/IS-95-B Mobile Station-Base Station Compatibility Standard for Dual-Mode Wideband Spread Spectrum Cellular System".

TR-45.5 "Physical Layer Standard for cdma2000 Spread Spectrum Systems", (the IS-2000 standard).
"A Wireless Token Ring Protocol for Ad-Hoc Networks," IEEE Aerospace Conference Proceedings, 2002. vol. 3, pp. 6-1219 to 3-1228.
3GPP TS 25.211 v5.0.0 (Mar. 2002) Technical Specification Group Radio Access Network; Physical Channels and Mapping of Transport Channels onto Physical Channels (FDD) (Release 5).
3GPP TS 25.212 v6.0.0 (Dec. 2003) Technical Specification Group Radio Access Network; Multiplexing and Channel Coding (FDD) (Release 6).
3GPP TS 25.213 v6.0.0 (Dec. 2003) Technical Specification Group Radio Access Network; Spreading and Modulation (FDD) (Release 6).
3GPP TS 25.214 v6.0.0 (Dec. 2003) Technical Specification Group Radio Access Network; Physical Layer Procedures (FDD) (Release 6).
3GPP2-C.S0002-C v1.0, "Physical Layer Standard for cdma2000 Spread Spectrum Systems", (TR 45.5), Release C, May 28, 2002.
ETSI TS 125 211 v5.1.0; "Universal Mobile Telecommunications System (UMTS); Physical channels and mapping of transport channels onto physical channels (FDD)", 3GPP TS 25.211 version 5.1.0 Release 5 (Sep. 2004).
ETSI TS 125 211 v5.6.0; "Universal Mobile Telecommunications System (UMTS); Physical channels and mapping of transport channels onto physical channels (FDD)", 3GPP TS 25.211 version 5.6.0 Release 5 (Sep. 2004).
ETSI TS 125 212 v6.2.0; "Universal Mobile Telecommunications System (UMTS); Multiplexing and channel coding (FDD)", 3G TS 25.212 version 6.2.0 Release 5 (Jun. 2004).
ETSI TS 125 213 v6.0.0; "Universal Mobile Telecommunications System (UMTS); Spreading and modulation (FDD)", 3G TS 25.213 version 6.0.0 Release 5 (Dec. 2003).
ETSI TS 125 214 v6.3.0; "Universal Mobile Telecommunications System (UMTS); Physical layer procedures (FDD)", 3G TS 25.214 version 6.3.0 Release 5 (Sep. 2004).
IEEE Std. 802.11a-1999 Part 11: Wireless LAN Medium Access Control (MAC) and Physical Layer (PHY) Specifications: High-speed Physical Layer in the 5 GHZ Band.
IEEE Std. 802.11b-1999 Part 11: Wireless LAN Medium Access Control (MAC) and Physical Layer (PHY) Specifications: Higher-Speed Physical Layer Extension in the 2.4 GHz Band.
IEEE Std. 802.11 e-2003 Part 11: Wireless LAN Medium Access Control (MAC) and Physical Layer (PHY) Specifications, Amendment 4: Further Higher Data Rate Extension in the 2.4 GHz Band.
IEEE Std. 802.11 g-2003 Part 11: Wireless LAN Medium Access Control (MAC) and Physical Layer (PHY) Specifications, Amendment 4: Further Higher Data Rate Extension in the 2.4 GHz Band.
Mujtaba, "TGn Sync Proposal Technical Specification," IEEE Wireless LANS, IEEE 802.11-04/0899r5, May 2005, pp. 1-134.
Seung et al., : "Multi-Stage Partial PIC Receivers for Multi-Rate DS-CDMA System with Multiple Modulation", IEEE 2003, pp. 591-594.
TIA/EIA-95-B Mobile Station-Base Station Compatibility Standard for Dual-Mode Wideband Spread Spectrum Cellular System (IS-95 Standard), Mar. 1999.
TIA/EIA/IS-856 cdma2000 High Rate Packet Data Air Interface Specification, Nov. 2000.
TIA/EIA/IS-856-A, "cdma2000 High Rate Packet Data Air Interface Specification", (Revision of TIA/EIA/IS-856), Apr. 2004.
TR-45.5 Physical Layer Standard for cdma2000 Spread Spectrum Systems, 3GPP2 C.S000-2D, Version 1.0, Feb. 13, 2004.
Won-Tae et al., : "MMAC : An Efficient WMATM MAC for Multicast Communications", Global Telecommunications Conference—Globecom '99, IEEE , pp. 587-591.
Mangold, et al.: "IEEE 802.11e Wireless LAN for Quality of Service," Feb. 2002, pp. 1-8, XP002251598.
International Preliminary Report on Patentability—PCT/US2005/015818, International Preliminary Examining Authority—Alexandria, Virginia, USA—May 13, 2007.
International Search Report—PCT/US2005/018834, International Search Authority—European Patent Office—Aug. 9, 2005.
Written Opinion—PCT/US2005/018834, International Search Authority—European Patent Office—Aug. 9, 2005.
Written Opinion of the International Preliminary Examining Authority—PCT/US2005/018834, International Preliminary Examination Authority—Alexandria, Virginia, US—Oct. 12, 2006.
International Preliminary Report on Patentability—PCT/US2005/018834. International Preliminary Examination Authority—Alexandria, Virginia, US—Jan. 31, 2007.
3GPP TS 25.211 Physical channels and mapping of transport channels onto physical channels (FDD). Release 5, V5.0.0, Mar. 2002.
ETSI TS 125 213 v6.0.0; "Universal Mobile Telecommunications System (UMTS); Spreading and modulation (FDD)", 3G TS 25.213 version 6.0.0 Release 6 (Dec. 2003).
European Search Report—EP10176962, Search Authority—Munich Patent Office, Nov. 5, 2010.
Miyashita, K. et al. "Eigenbeam Space Division Multiplexing (E-SDM) in a MIMO Channel", Technical Research Report by Electric Information Communication Academic Conference, May 17, 2002, vol. 102, No. 86, pp. 13-18, RCS2002-53.
Partial European Search Report—EP10010614 Search Authority—Munich Patent Office, Feb. 1, 2011.
Taiwanese Search report—095132750—TIPO—Nov. 15, 2010.
TGn Sync Complete Proposal, IEEE 802.11-04/888r13, IEEE mentor, Jul. 8, 2005.
Translation of Office Action in Japan application 2008-531288 corresponding to U.S. Appl. No. 11/312,187, citing IEEE_802_11_04_888r13_TGn_Sync_Complete_year_2005, JP2005505148, JP2000174820, JP2005020163 and WO2005039133 dated Jan. 25, 2011.
European Search Report—EP10010614—Search Authority—Munich—Jun. 1, 2011.
International Search Report—PCT/US2005/015818, International Searching Authority—European Patent Office—Dec. 23, 2005.
"MIMO-related Technology," Collection of Standard Technologies of the Japan Patent Office, May 25, 2005, 1-1-1, 1-1-3, URL, http://www.jpo.go.jp/shiryou/s_sonota/hyoujun_gijutsu/mimo/mokuji.htm.
Taiwan Search Report—TW094114603—TIPO—Nov. 2, 2011.
Written Opinion—PCT/US2005/015818, International Searching Authority—European Patent Office—Dec. 23, 2005.
Edfors et al, "OFDM Channel Estimation by Singular Value Decomposition," IEEE Transactions on Communications, 46(7):931-939, (Jul. 1998).
European Search Report—EP10011027—Search Authority—Munich—Apr. 20, 2012.
Fu J., et al., "The Largest Eigenvalue Characteristics for MIMO Channel with Spatial Correlation in Multipath Fading", Technical Report of the Institute of Electronics, Information and Communication Engineers, Feb. 27, 2003, vol. 102, No. 681, pp. 171-178, RCS 2002-334.
Ivrlac M. T., et al., "Efficient Use of Fading Correlations in MIMO Systems", Vehicular Technology Conference, 2001, VTC 2001 Fall, vol. 4, pp. 2763-2767.
Sheu, Shiann-Tsong et al.: "An Improved Data Flushing MAC Protocol for IEEE 802.11 Wireless Ad Hoc Network," VTC 2002-Fall. 2002 IEEE 56th Vehicular Technology Conference Proceedings. Vancouver, Canada, Sept. 24-28, 2002; [IEEE Vehicular Technolgy Conference], New York, NY: IEEE, US, vol. 4, (Sep. 24, 2002), pp. 2435-2439; XP010608871; ISBN: 978-0-78037467-6 the whole document.
Cheng Chen J., "A Comparison of MAC Protocols for Wireless Local Networks Based on Battery Power Consumption", Infocom '98. Seventeenth Annual Joint Conference of the IEEE Computer and Communications Societies. Proceedings, IEEE, IEEE, Apr. 2, 1998, vol. 1, p. 150-157.
Fang, J.C., et al., "A synchronous, reservation based medium access control protocol for multihop wireless networks", Wireless Communications and Networking, 2003, WCNC 2003. 2003 IEEE, IEEE, Mar. 20, 2003, vol. 2, p. 994-998.
Gyasi-Agyei A., et al., "GPRS-Features and Packet Random Access Channel Performance Analysis", Networks, 2000. (ICON 2000). Proceedings. IEEE International Conference on, IEEE, Dec. 31, 2000, p. 13-17.

John Ketchum, et al., "High-Throughput Enhancements for 802.11: Features and Performance of Qualcomm's Proposal", IEEE802.11-04/0873r1 , IEEE mentor, Aug. 13, 2004, slide 58-66.

Kuehnel, Thomas, "Wireless Multimedia Enhancements (WME)", 11-03-0504-01-000e, IEEE mentor, Jul. 23, 2003, paragraph 3.4.3.

Shou-Chih Lo, et al., "An Efficient Multipolling Mechanism for IEEE 802.11 Wireless LANs", Computers, IEEE Transactions on, IEEE, Jun. 30, 2003, vol. 52, Issue 6, p. 764-778.

* cited by examiner

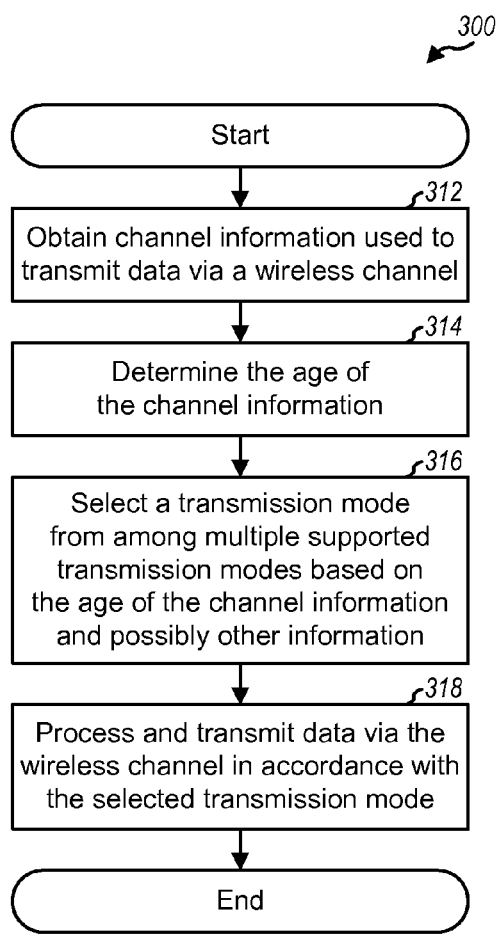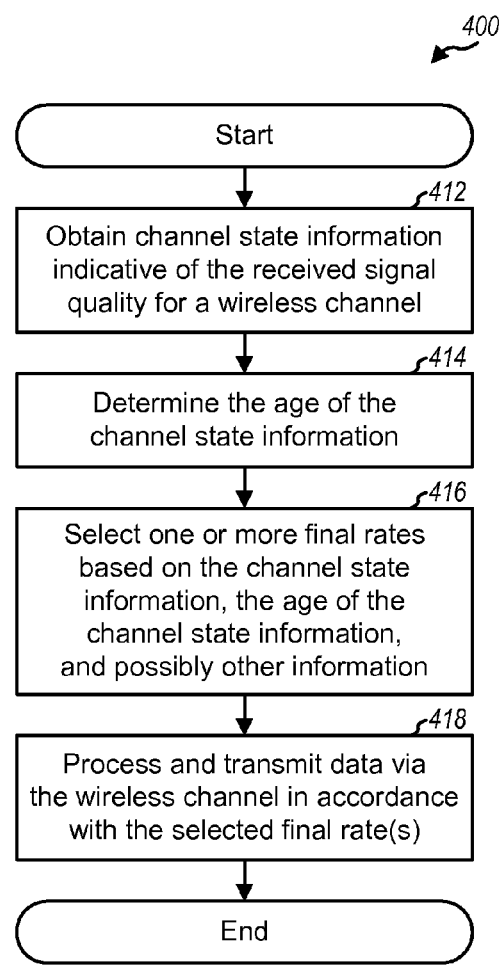
FIG. 3
FIG. 4

TRANSMISSION MODE AND RATE SELECTION FOR A WIRELESS COMMUNICATION SYSTEM

CLAIM OF PRIORITY UNDER 35 U.S.C. §119

The present Application for Patent claims priority to Provisional Application Ser. No. 60/569,201, entitled "Transmission Mode Selection and Rate Selection for a Wireless Communication System," filed May 7, 2004, and assigned to the assignee hereof and hereby expressly incorporated by reference herein.

CLAIM OF PRIORITY UNDER 35 U.S.C. §120

The present application for patent is a Continuation and claims priority to U.S. patent application Ser. No. 11/101,086 entitled "Transmission Mode and Rate Selection for a Wireless Communication System" filed Apr. 6, 2005 now allowed, and assigned to the assignee hereof and hereby expressly incorporated by reference herein.

BACKGROUND

I. Field

The present invention relates generally to communication, and more specifically to transmission mode and rate selection for a wireless communication system.

II. Background

A wireless multiple-input multiple-output (MIMO) system employs multiple ($N_T$) transmit antennas at a transmitting entity and multiple ($N_R$) receive antennas at a receiving entity for data transmission. A MIMO channel formed by the $N_T$ transmit antennas and $N_R$ receive antennas may be decomposed into $N_S$ spatial channels, where $N_S \leq \min\{N_T, N_R\}$. The Ns spatial channels may be used to transmit data in parallel to achieve higher throughput and/or redundantly to achieve greater reliability.

Each spatial channel may experience various deleterious channel conditions such as, e.g., fading, multipath, and interference effects. The $N_S$ spatial channels may experience different channel conditions and may achieve different signal-to-noise-and-interference ratios (SNRs). The SNR of each spatial channel determines its transmission capacity, which is typically quantified by a particular data rate that may be reliably transmitted on the spatial channel. For a time variant MI4MO channel, the channel condition changes over time and the SNR of each spatial channel also changes over time. The different SNRs for different spatial channels plus the time varying nature of the SNR for each spatial channel make it challenging to efficiently transmit data in a MIMO system.

There is therefore a need in the art for techniques to efficiently transmit data in a time-varying wireless system.

SUMMARY

Techniques for selecting a suitable transmission mode and one or more suitable rates for data transmission in a wireless (e.g., MIMO) communication system are described herein. According to an embodiment of the invention, a method is provided in which the age of channel information available for use to transmit data via a wireless channel is determined. A transmission mode is selected from among multiple transmission modes based on the age of the channel information. Data is transmitted via the wireless channel in accordance with the selected transmission mode.

According to another embodiment, an apparatus is described which includes a controller and a spatial processor. The controller determines the age of channel information available for use to transmit data via a wireless channel and selects a transmission mode from among multiple transmission modes based on the age of the channel information. The spatial processor spatially processes data in accordance with the selected transmission mode.

According to yet another embodiment, an apparatus is described which includes means for determining the age of channel information available for use to transmit data via a wireless channel and means for selecting a transmission mode from among multiple transmission modes based on the age of the channel information.

According to yet another embodiment of the invention, a method is provided in which channel state information indicative of received signal quality for a wireless channel used for data transmission is obtained. The age of the channel state information is determined. At least one rate is selected for data transmission via the wireless channel based on the channel state-information and the age of the channel state information.

According to yet another embodiment, an apparatus is described which includes a controller and a data processor. The controller obtains channel state information indicative of received signal quality for a wireless channel used for data transmission, determines the age of the channel state information, and selects at least one rate for data transmission via the wireless channel based on the channel state information and the age of the channel state information. The data processor processes data in accordance with the at least one rate selected by the controller.

According to yet another embodiment, an apparatus is described which includes means for obtaining channel state information indicative of received signal quality for a wireless channel used for data transmission, means for determining the age of the channel state information, and means for selecting at least one rate for data transmission via the wireless channel based on the channel state information and the age of the channel state information.

According to yet another embodiment, a method is provided in which the age of channel information available for use to transmit data via a wireless channel is determined. A transmission mode is selected from among multiple transmission modes based on the age of the channel information. Channel state information indicative of received signal quality for the wireless channel is obtained. The age of the channel state information is determined. At least one rate is selected for data transmission based on the channel state information and the age of the channel state information. Data is transmitted via the wireless channel in accordance with the transmission mode and the at least one rate selected for data transmission.

Various aspects and embodiments of the invention are described in further detail below.

BRIEF DESCRIPTION OF THE DRAWINGS

FIG. 3 shows a process for selecting a transmission mode for data transmission.

FIG. 4 shows a process for selecting rate(s) for data transmission.

DETAILED DESCRIPTION

Figure 1A:
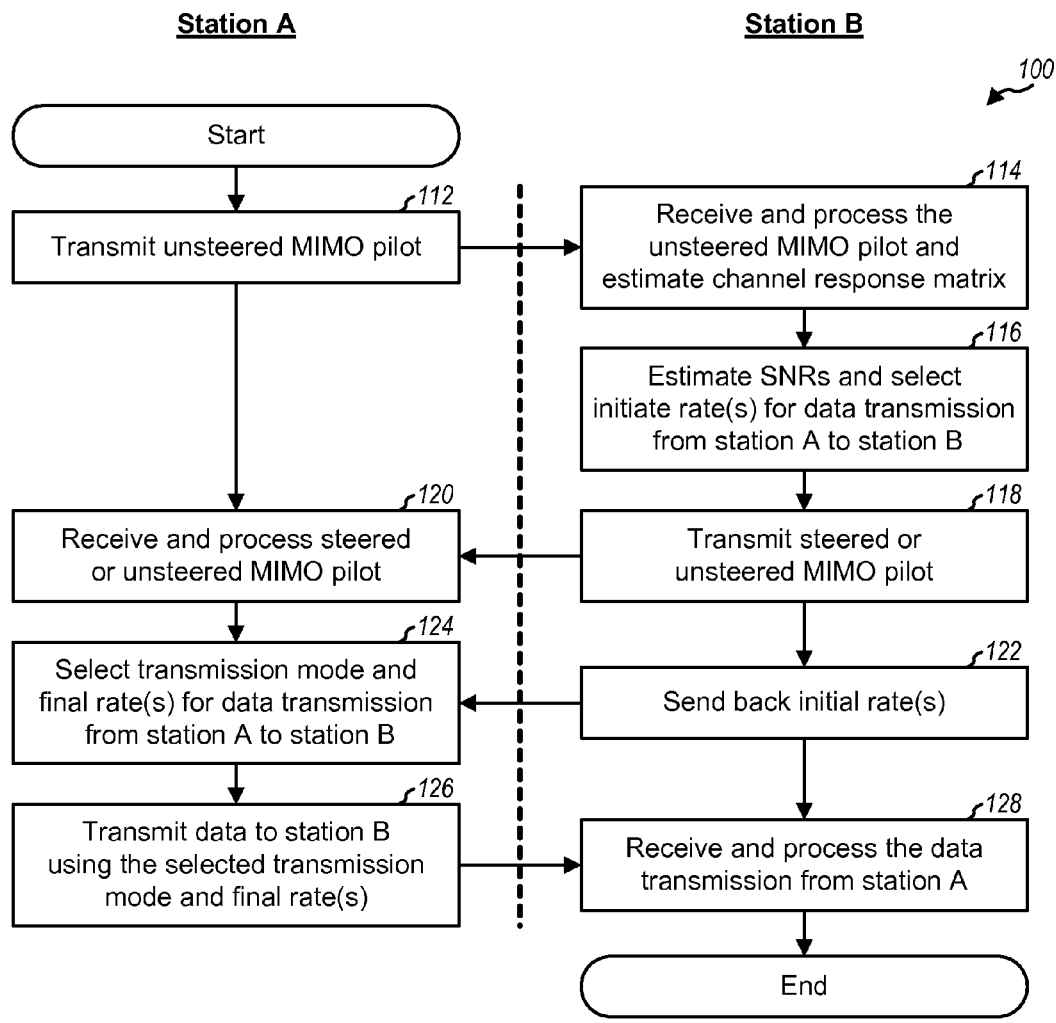
FIGS. 1A and 1B show two exemplary pilot and data transmission schemes.

The word "exemplary" is used herein to mean "serving as an example, instance, or illustration." Any embodiment described herein as "exemplary" is not necessarily to be construed as preferred or advantageous over other embodiments.

The transmission mode and rate selection techniques described herein may be used for various wireless communication systems. These techniques may be used for single-carrier as well as multi-carrier systems. These techniques may also be used for time division duplex (TDD) as well as frequency division duplex (FDD) systems. For an FDD system, the downlink (or forward link) and uplink (or reverse link) are allocated different frequency bands, and the channel response for one link may not correlate well with the channel response for the other link. For a TDD system, the downlink and uplink share the same frequency band, and a high degree of correlation normally exists between the downlink and uplink channel responses. Pilot transmission, channel estimation, and spatial processing may be performed in a manner to take advantage of this correlation. For clarity, the transmission mode and rate selection is described below for an exemplary single-carrier TDD MIMO system. Also for clarity, station A is a transmitting entity and station B is a receiving entity for a data transmission from station A to station B. Each station may be an access point (which is also referred to as a base station) or a user terminal (which is also referred to as a mobile station, a user equipment, a wireless device, and so on).

The exemplary MIMO system supports multiple transmission modes for improved performance and greater flexibility. Each transmission mode may perform spatial processing (if at all) in a different manner and may or may not require channel information for spatial processing. Table 1 lists some exemplary transmission modes and their short descriptions.

TABLE 1

| Transmission Mode | Description |
| --- | --- |
| Steered mode | Multiple data streams are transmitted on multiple orthogonal spatial channels of a MIMO channel. |
| Unsteered mode | Multiple data streams are transmitted on multiple spatial channels of the MIMO channel. |

The steered mode uses channel information (e.g., eigenvectors) to transmit data on orthogonal spatial channels (or "eigenmodes") of a MIMO channel. The unsteered mode does not need any channel information to transmit data on spatial channels of the MIMO channel.

The MEMO system may employ spatial spreading for the unsteered mode to enhance performance. With spatial spreading, station A performs spatial processing with different steering matrices so that a data transmission observes an ensemble of effective channels and is not stuck on a single bad channel realization for an extended period of time. Consequently, performance is not dictated by the worst-case channel condition.

Each transmission mode has different capabilities and requirements. The steered mode can typically achieve better performance and may be used if station A has sufficient channel information to transmit data on orthogonal spatial channels. The unsteered mode does not require channel information, but performance may not be as good as the steered mode. A suitable transmission mode may be selected for use depending on the available channel information, the capabilities of stations A and B, system requirements, and so on.

For the steered mode, data is transmitted on $N_S$ eigenmodes of the MIMO channel formed by the $N_T$ transmit antennas at station A and the $N_R$ receive antennas at station B. The MIMO channel may be characterized by an $N_R \times N_T$ channel response matrix H, which may be "diagonalized" to obtain the $N_S$ eigenmodes of the MIMO channel. This diagonalization may be achieved by performing either singular value decomposition of M or eigenvalue decomposition of a correlation matrix of H, which is $R = H^H H$, where $H^H$ denotes the conjugate transpose of H. The singular value decomposition of H may be expressed as:

$$H = U \cdot \Sigma \cdot V^H, \quad \quad \text{Eq (1)}$$

where U is an $N_R \times N_R$ unitary matrix of left eigenvectors of H; $\Sigma$ is an $N_R \times N_T$ diagonal matrix of singular values of H; and V is an $N_T \times N_T$ unitary matrix of right eigenvectors of H. A unitary matrix M is characterized by the property $M^H M = I$, where I is the identity matrix. The columns of a unitary matrix are orthogonal to one another. The right eigenvectors in V may be used for spatial processing by station A to transmit data on the $N_S$ eigenmodes of H. The left eigenvectors in U may be used for receiver spatial processing by station B to recover the data transmitted on the $N_S$ eigenmodes. The diagonal matrix $\Sigma$ contains non-negative real values along the diagonal and zeros elsewhere. These diagonal entries are referred to as singular values of H and represent the channel gains for the $N_S$ eigenmodes. The diagonal elements of $\Sigma$ may be ordered from largest to smallest, and the columns of V and U may be ordered correspondingly, as described below. Singular value decomposition is described by Gilbert Strang in "Linear Algebra and Its Applications," Second Edition, Academic Press, 1980.

Station A performs spatial processing for the steered mode as follows:

$$x^s = V \cdot s, \quad \quad \text{Eq (2)}$$

where s is a vector with up to $N_S$ s data symbols to be sent on the $N_S$ eigenmodes; and $x^s$ is a vector with $N_T$ transmit symbols to be sent from the $N_T$ transmit antennas.

As used herein, a "data symbol" is a modulation symbol for data, a "pilot symbol" is a modulation symbol for pilot (which is data that is known a priori by both stations A and B), a "transmit symbol" is a symbol to be sent from a transmit antenna, and a "received symbol" is a symbol obtained from a receive antenna.

The received symbols at station B may be expressed as:

$$r^s = H \cdot x^s + n = H \cdot V \cdot s + n = H_{eff}^s \cdot s + n, \quad \quad \text{Eq (3)}$$

where $r^s$ is a vector with $N_R$ received symbols for the $N_R$ receive antennas;

$H_{eff}^s = H \cdot V$ is an effective MIMO channel response matrix observed by s for the steered mode; and n is a noise vector.

For simplicity, the noise is assumed to be additive white Gaussian noise (AWGN) with a zero mean vector and a covariance matrix of $\phi_{nn} = \sigma_{noise}^2 \cdot I$, where $\sigma_{noise}^2$ is the variance of the noise. Station B may recover the data symbols in s using various receiver processing techniques.

Station B may perform full-CSI spatial processing for the steered mode as follows:

$$\hat{s}_{fcsi}^s = \Sigma^{-1} \cdot U^H \cdot r^s = \Sigma^{-1} \cdot U^H H \cdot x^s + n_{fcsi} = s + n_{fcsi}, \quad \text{Eq (4)}$$

where $\hat{s}_{fcsi}^s$ is a vector with up to $N_S$ "detected" data symbols, which are estimates of the up to $N_S$ data symbols in s; and $n_{fcsi}$ is the noise after the receiver spatial processing.

Alternatively, station B may perform minimum mean square error (MMSE) spatial processing, as follows:

$$\hat{s}_{mmse}^s = D_{mmse}^s \cdot M_{mmse}^s \cdot r^s = D_{mmse}^s \cdot Q_{mmse}^s \cdot s + n_{mmse}^s, \quad \text{Eq (5)}$$

where $M_{mmse}^s = [H_{eff}^{s\,H} \cdot H_{eff}^s + \sigma_{noise}^2 \cdot I]^{-1} \cdot H_{eff}^{s\,H}$ is an MMSE spatial filter matrix;

$Q_{mmse}^s = M_{mmse}^s \cdot H_{eff}^s$;

$D_{mmse}^s = [\text{diag}[Q_{mmse}^s]]^{-1}$ is a diagonal matrix ; and $n_{mmse}^s$ is the MMSE filtered noise for the steered mode.

The spatial filter matrix $M_{mmse}^s$ minimizes the mean square error between the symbol estimates from the spatial filter and the data symbols in s. The symbol estimates from the spatial filter are unnormalized estimates of the data symbols. The multiplication with the scaling matrix $D_{mmse}^s$ provides normalized estimates of the data symbols.

For the unsteered mode with spatial spreading, station A performs spatial processing as follows:

$$x^u = V_{ss} \cdot s, \qquad \text{Eq (6)}$$

where $V_{ss}$ is an $N_T \times N_T$ steering matrix for spatial spreading; and $x^u$ is a vector with $N_T$ transmit symbols for the unsteered mode.

With spatial spreading, each data symbol in s is spatially spread with a respective column of $V_{ss}$. The matrix $V_{ss}$ typically changes over time and/or frequency but is known by both stations A and B. Each transmit symbol in $x^u$ includes a component of each of the $N_S$ data symbols in s.

The received symbols at station B for the unsteered mode may be expressed as:

$$r^u = H \cdot x^u + n = H \cdot V_{ss} \cdot s + n = H_{\mathit{eff}}^u \cdot s + n, \qquad \text{Eq(7)}$$

where $r^u$ is a vector with $N_R$ received symbols for the $N_R$ receive antennas; and $H_{\mathit{eff}}^u = H \cdot V_{ss}$ is an effective MIMO channel response matrix observed by s for the unsteered mode with spatial spreading.

Station B may perform channel correlation matrix inversion (CCMI) spatial processing, which is also commonly referred to as a zero-forcing, as follows:

$$\hat{s}_{ccmi}^u = M_{ccmi}^u \cdot r^u = s + n_{ccmi}^u, \qquad \text{Eq(8)}$$

where $M_{ccmi}^u = [H_{\mathit{eff}}^{u\,H} \cdot H_{\mathit{eff}}^u]^{-1} \cdot H_{\mathit{eff}}^{u\,H}$ is a CCMI spatial filter matrix; and $n_{ccmi}^u$ is the CCMI filtered noise for the unsteered mode.

Alternatively, station B may perform MMSE spatial processing as follows:

$$\hat{s}_{mmse}^u = D_{mmse}^u \cdot M_{mmse}^u \cdot r^u = D_{mmse}^u \cdot Q_{mmse}^u \cdot s + n_{mmse}^u, \qquad \text{Eq(9)}$$

where $M_{mmse}^u = [H_{\mathit{eff}}^{u\,H} \cdot H_{\mathit{eff}}^u + \sigma_{noise}^2 \cdot I]^{-1} \cdot H_{\mathit{eff}}^{u\,H}$ is an MMSE spatial filter matrix;

$Q_{mmse}^u = M_{mmse}^u \cdot H_{\mathit{eff}}^u$;

$D_{mmse}^u = [\text{diag}\, [Q_{mmse}^u]]^{-1}$; and $n_{mmse}^u$ is the MMSE filtered noise for the unsteered mode.

As shown in equations (5) and (8), station B may perform MMSE spatial processing for both the steered and unsteered modes. However, different matrices $H_{\mathit{eff}}^s$ and $H_{\mathit{eff}}^u$ are used for the steered and unsteered modes, respectively.

If spatial spreading is not used for the unsteered mode, then the transmit vector may be expressed as: $x^u = s$. Station B may recover the data symbols in s using CCMI or MMSE receiver spatial processing. However, the spatial filter matrix would be derived based on H instead of $H_{\mathit{eff}}^u$.

Station A performs spatial processing with V for the steered mode. Station B performs spatial matched filtering with U (or with H and V) for the steered mode and with H and $V_{ss}$ for the unsteered mode. An estimate of H may be obtained by one station based on an "unsteered MIMO" pilot sent by the other station. An unsteered MIMO pilot is a pilot comprised of N pilot transmissions sent from N transmit antennas, where the pilot transmission from each transmit antenna is identifiable by the receiving entity, $N=N_T$ if the unsteered MIMO pilot is sent by station A, and $N=N_R$ if the unsteered MIMO pilot is sent by station B. This may be achieved, for example, by using a different orthogonal sequence for the pilot transmission from each transmit antenna and/or sending the pilot transmission for each transmit antenna on a different frequency subband. The unsteered MIMO pilot may be expressed as:

$$x_{pilot}^u(i) = w(i) \cdot p(i), \qquad \text{Eq (10)}$$

where p(i) is a pilot symbol to be transmitted in symbol period i;

w(i) is a vector with N chips for the N transmit antennas for symbol period i; and $x_{pilot}^u(i)$ is a transmit vector for the unsteered MIMO pilot for symbol period i.

For example, if N=4, then four Walsh vectors $w(0)=[1\ 1\ 1\ 1]^T$, $w(1)=[1\ -1\ 1\ -1]^T$, $w(2)=[1\ 1\ -1\ -1]^T$, and $w(3)=[1\ -1\ -1\ 1]^T$ may be used for four symbol periods, where "$T$" denotes a transpose. A complete unsteered MIMO pilot may be sent in N (consecutive or non-consecutive) symbol periods, or one symbol period for each chip of the orthogonal sequence. Upon receiving the complete unsteered MIMO pilot, the receiving entity can perform the complementary processing on the received pilot to estimate H. For simplicity, the following description assumes no error in channel estimation.

For a TDD system, the downlink and uplink channel responses may be assumed to be reciprocal of one another. That is, if H represents a channel response matrix from antenna array X to antenna array Y, then a reciprocal channel implies that the coupling from array Y to array X is given by $H^T$. However, the responses of the transmit and receive chains at station A are typically different from the responses of the transmit and receive chains at station B. Calibration may be performed to derive correction matrices that can account for the difference in the responses of the transmit and receive chains at the two stations. The application of the correction matrices at these two stations allows a calibrated channel response for one link to be expressed as a transpose of a calibrated channel response for the other link. For simplicity, the following description assumes a flat frequency response for the transmit and receive chains, $H_{ab} = H$ is the channel response matrix for the link from station A to station B, and $H_{ba} = H^T$ is the channel response matrix for the link from station B to station A.

The singular value decomposition of $H_{ab}$ and $H_{ba}$ may be expressed as:

$$H_{ab} = U \cdot \Sigma \cdot V^H \text{ and } H_{ba} V^* \cdot \Sigma^T \cdot U^T, \qquad \text{Eq (11)}$$

where $V^*$ is a complex conjugate of V. As shown in equation (11), U and V are matrices of left and right eigenvectors of $H_{ab}$, and $V^*$ and $U^*$ are matrices of left and right eigenvectors of $H_{ba}$. Stations A and B may use the matrices V and $U^*$, respectively, for spatial processing to transmit data for the steered mode.

Because of the reciprocal channel, one station may perform the singular value decomposition to obtain either V or $U^*$. This station may then transmit a "steered MIMO" pilot, which is a pilot sent on the eigenmodes of the MIMO channel. The other station may then estimate its matrix of eigenvectors based on the steered MIMO pilot.

Station A may transmit a steered MIMO pilot as follows:

$$x_{pilot,m}^s = V_m p_m, \qquad \text{Eq (12)}$$

where $v_m$ is the m-th eigenvector/column of V;

$p_m$ is a pilot symbol to be transmitted on the m-th eigenmode of $H_{ab}$; and $x_{pilot,m}^s$ is a transmit vector for the steered MIMO pilot for the m-th eigenmode.

The received steered MIMO pilot at station B may be expressed as:

$$r_{pilot,m}^s = H_{ab} \cdot x_{pilot,m}^s + n = U \cdot \Sigma \cdot V^H \cdot v_m \cdot p_m + n = u_m \cdot \sigma_m \cdot p_m + n, \quad \text{Eq(13)}$$

where $r_{pilot}^s$ is the received vector for the steered MIMO pilot for the m-th eigenmode;

$\sigma_m$ is the m-th diagonal element of $\Sigma$; and $u_m$ is the m-th eigenvector/column of U.

Equation (13) indicates that station B may obtain an estimate of U, one column at a time, based on a steered MIMO pilot sent by station A. Station A may send a complete steered MIMO pilot on all $N_S$ eigenmodes in one or more (consecutive or non-consecutive) symbol periods. Station B may also transmit a steered MIMO pilot to station A in similar manner using the columns of U*.

Pilot and data may be transmitted in various manners in the MIMO system. For the steered mode, station A uses channel information (or "eigensteering" information) to transmit data on the eigenmodes of the MIMO channel. The channel information may be in the form of H (which may be obtained from an unsteered MIMO pilot sent by station B) or in the form of U or V (which may be obtained from a steered MIMO pilot sent by station B). Station B also uses channel information (e.g., H, U, or V for the steered mode, and H for the unsteered mode) to recover a data transmission from station A. For both modes, station B may estimate the received SNRs for the spatial channels, determine the rate(s) supported by the received SNRs, and send either the received SNRs or the supported rate(s) to station A. Station A may then select a suitable transmission mode and suitable rate(s) for data transmission to station B based on the received feedback and possibly other information. For clarity, the rates selected by station B are referred to as the initial rates, and the rates selected by station A are referred to as the final rates. Also for clarity, the following description assumes that station B sends rate information (instead of SNR information) back to station A.

FIG. 1A shows an exemplary pilot and data transmission scheme 100 for the MIMO system. Initially, station A transmits an unsteered MIMO pilot (block 112). Station B receives and processes the unsteered MIMO pilot and obtains an estimate of the channel response matrix H (block 114). Station B also estimates the received SNRs for the (orthogonal or non-orthogonal) spatial channels of the MIMO channel based on the received pilot (block 116). Station B also determines either an initial rate for each eigenmode (for the steered mode) or a single initial rate for the MIMO channel (for the unsteered mode) based on the received SNRs (also block 116). The initial rate(s) are applicable for a data transmission from station A to station B.

Station B transmits either an unsteered MIMO pilot or a steered MIMO pilot using the eigenvectors derived from H (block 118). Station A receives and processes the steered or unsteered MIMO pilot to obtain a channel estimate for the link from station A to station B (block 120). Station B also sends the initial rate(s) to station A (block 122). Station A receives the initial rate(s) and determines a transmission mode and final rate(s) to use for data transmission to station B, as described below (block 124). Station A then transmits data to station B using the selected transmission mode and final rate(s) (block 126). Station B receives and processes the data transmission from station A (block 128).

Figure 1B:
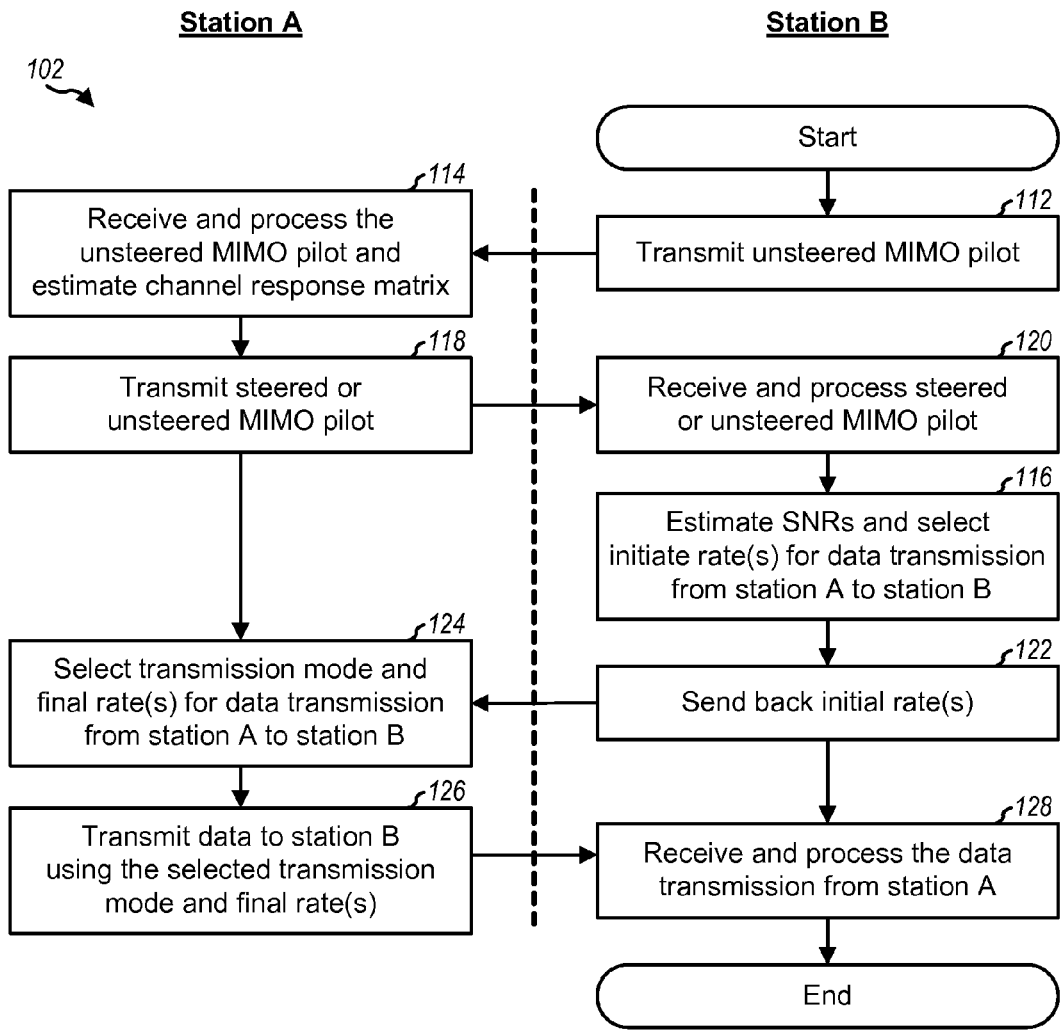

FIG. 1B shows another exemplary pilot and data transmission scheme 102 for the MIMO system. Initially, station B transmits an unsteered MIMO pilot (block 112). Station A receives and processes the unsteered MEMO pilot and obtains an estimate of the channel response matrix H (block 114). Station A then transmits either an unsteered MIMO pilot or a steered MIMO pilot using the eigenvectors derived from H (block 118). Station B receives and processes the steered or unsteered MIMO pilot to obtain a channel estimate for the link from station A to station B (block 120). The remaining processing for blocks 116, 122, 124, 126 and 128 are as described above for FIG. 1A.

As shown in FIGS. 1A and 1B, pilots may be transmitted in various manners to allow both stations A and B to obtain a channel estimate for the link from station A to station B. Both stations may transmit an unsteered MIMO pilot. Alternatively, one station may transmit an unsteered MIMO pilot, and the other station may transmit a steered MIMO pilot. In this case, either station A or B may transmit the unsteered MIMO pilot, as shown in FIGS. 1A and 1B.

Figure 2:
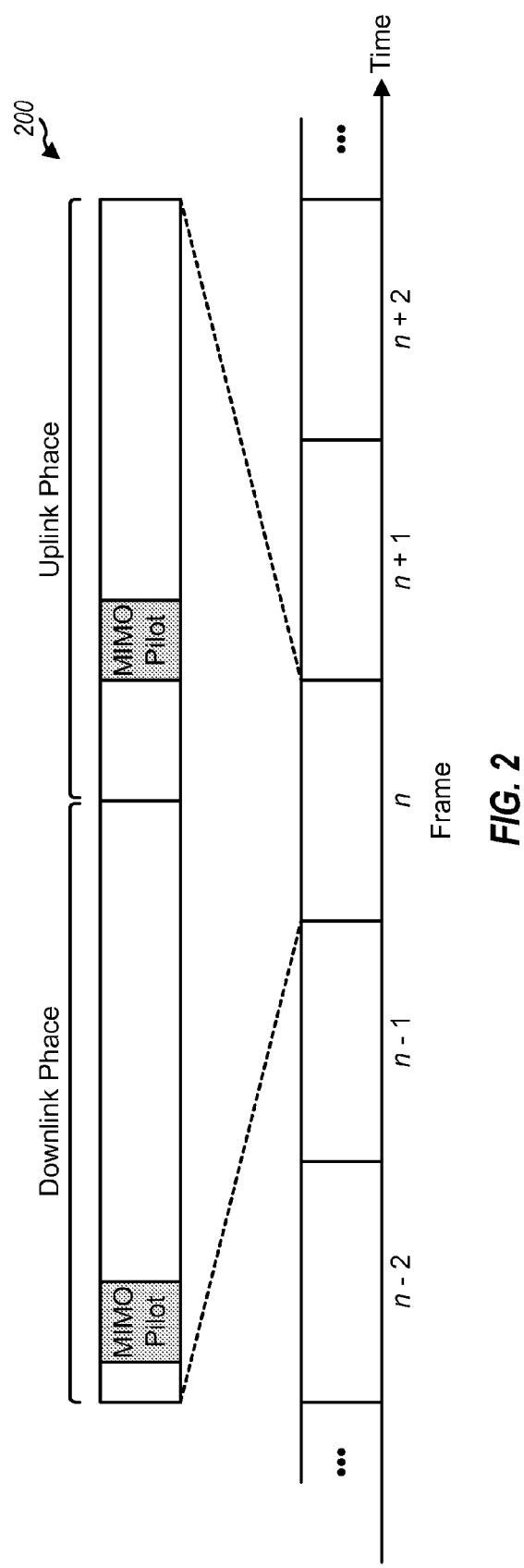
FIG. 2 shows a frame structure that may be used for the MIMO system.

FIG. 2 shows an exemplary frame structure 200 that may be used for the MIMO system. Data transmission occurs in units of frames, with each frame spanning a particular time duration (e.g., 2 msec). Each frame may be partitioned into (1) a downlink phase during which data and pilot may be sent on the downlink and (2) an uplink phase during which data and pilot may be sent on the uplink. For each frame, a MIMO pilot may or may not be sent on the downlink, and a MIMO pilot may or may not be sent on the uplink.

Station B may estimate the received SNRs for the spatial channels based on a steered or unsteered MIMO pilot received from station A. The received SNR is dependent on the spatial processing performed by both stations A and B.

For the steered mode with full-CSI receiver spatial processing, the SNR of each eigenmode may be expressed as:

$$SNR_{fcsi,m}(n) = 10 \log_{10}\left(\frac{P_m(n) \cdot \sigma_m^2(n)}{\sigma_{noise}^2}\right), \quad \text{Eq (14)}$$

for $i = 1, \ldots, N_S$, where $P_m(n)$ is the transmit power used for the m-th eigenmode in frame n;

$\sigma_m$ is the m-th diagonal element of $\Sigma(n)$ for frame n; and $SNR_{fsci,m}(n)$ is the SNR of the m-th eigenmode in frame n. The $N_S$ eigenmodes may achieve different SNRs. Consequently, different rates may be used for the data streams sent on these eigenmodes.

For the steered and unsteered modes with MMSE receiver spatial processing, the SNR of each spatial channel may be expressed as:

$$SNR_{mmse,m}(n) = 10 \log_{10}\left(\frac{q_m(n)}{1 - q_m(n)} P_m(n)\right), \quad \text{Eq (15)}$$

for $i = 1, \ldots, N_S$, where $q_m(n)$ is the m-th diagonal element of $Q_{mmse}^s$ or $Q_{mmse}^u$ for frame n; and $SNR_{mmse,m}(n)$ is the SNR of the m-th spatial channel in frame n.

For the unsteered mode with CCMI receiver spatial processing, the SNR of each spatial channel may be expressed as:

$$SNR_{ccmi,m}(n) = 10 \log_{10}\left(\frac{P_m(n)}{r_m(n) \cdot \sigma_{noise}^2}\right), \quad \text{Eq (16)}$$

for $i = 1, \ldots, N_S$, where $r_m(n)$ is the m-th diagonal element of $[R_{eff}^u]^{-1}$ and $R_{eff}^u = H_{eff}^{u^H} \cdot H_{EFF}^U$ for frame n; and $SNR_{ccmi,m}(n)$ is the SNR of the m-th spatial channel in frame n.

In the above equations, the quantity $P_m(n)/\sigma_{noise}^2$ is the SNR (in linear units) prior to the receiver spatial processing. The quantities $SNR_{fcsi,m}(n)$, $SNR_{mmse,m}(n)$, and $SNR_{ccmi,m}$ (n) are the SNRs (in units of decibel (dB)) after the receiver spatial processing and are also referred to as the received SNRs. In the following description, "SNR" refers to received SNR unless noted otherwise.

For the unsteered mode with spatial spreading, the $N_S$ spatial channels achieve similar SNRs because of the spatial spreading with the matrix $V_{ss}$. Consequently, the same rate may be used for all of the data streams sent on these spatial channels. With spatial spreading, each data symbol is transmitted on all $N_S$ spatial channels and observes an average SNR for all spatial channels, which may be expressed as:

$$SNR_{mmse}(n) = 10\log_{10}\left(\sum_{m=1}^{N_S} \frac{q_m(n)}{1-q_m(n)} P_m(n)\right), \quad \text{Eq (17)}$$

and $$SNR_{ccmi}(n) = 10\log_{10}\left(\sum_{m=1}^{N_S} \frac{P_m(n)}{r_m(n)\cdot\sigma_{noise}^2}\right). \quad \text{Eq (18)}$$

The SNR averaging may be done in linear unit, as shown in equations (17) and (18), or in dB.

For the steered mode, station B may determine an initial rate for each eigenmode based on its $SNR_m(n)$, which may be equal to $SNR_{fsci,m}(n)$ computed as shown in equation (14) or equal to $SNR_{mmse,m}(n)$ computed as shown in equation (15). The MIMO system may support a set of rates, and each rate may be associated with a particular data rate, a particular coding scheme, a particular modulation scheme, and a particular minimum SNR required to achieve a specified desired level of performance (e.g., 1% packet error rate). The required SNR for each non-zero rate may be obtained by computer simulation, empirical measurements, and so on. The set of supported rates and their required SNRs may be stored in a look-up table. The $SNR_m(n)$ for each eigenmode may be provided to the look-up table, which then returns a rate $R_m(n)$ supported by that SNR. The rate $R_m(n)$ is associated with the highest data rate and a required SNR that is less than or equal to $SNR_m(n)$, or $SNR_{req}(R_m(n))\leq SNR_m(n)$. 100561 For the unsteered mode, station B may determine an initial rate for the MIMO channel based on SNR(n), which may be equal to $SNR_{mmse}(n)$ computed as shown in equation (17) or equal to $SNR_{ccmi}(n)$ computed as shown in equation (18). The SNR(n) may be provided to a look-up table, which then returns a rate R(n) supported by the MIMO channel for the unsteered mode for that SNR. The same or different look-up tables may be used for the steered and unsteered modes. 100571 Station B may make an initial determination as to the transmission mode and rate(s) to use for a data transmission from station A to station B. Station A may make a final determination as to the transmission mode and rate(s) to use for this data transmission based on feedback received from station B and other pertinent information.

Station A may select which transmission mode to use for data transmission based on the age of the channel information available in the current frame and possibly other information regarding the MIMO channel. The characteristic of the MIMO channel may vary over time due to a number of factors such as, for example, fading, multipath, and interference. For a time variant system, the accuracy/reliability of the channel information degrades over time. Poor performance may be obtained by using inaccurate/unreliable channel information for data transmission. Since the channel information is derived from a MIMO pilot, the age of the channel information may be determined based on the age of the MIMO pilot used to derive the channel information. The age of the MIMO pilot may be determined as described below.

A MIMO pilot may be transmitted in each frame, or periodically in every few frames, or sporadically. Station A may derive an estimate of H based on an unsteered MIMO pilot received from station B and may decompose H to obtain the matrix V of eigenvectors used to transmit data on the eigenmodes of the MIMO channel. Station A may also obtain the eigenvectors directly from a steered MIMO pilot received from station B. However, this steered MIMO pilot is transmitted by station B using eigenvectors in U, which are derived from an estimate of H obtained by station B from an unsteered MIMO pilot sent by station A. Thus, the eigenvectors in V obtained by station A from the steered MIMO pilot sent by station B are, in effect, derived from the unsteered MIMO pilot sent by station A. The quality of the eigenvectors in V derived from the steered MIMO pilot received from station B is thus dependent on (and is only as good as) the quality of the corresponding unsteered MIMO pilot sent by station A, from which H and U are derived.

Station A may keep track of when MIMO pilots are transmitted to and received from station B. For example, station A may keep a record of (1) the time each unsteered MIMO pilot is transmitted, (2) the time each steered MIMO pilot is transmitted, (3) the time each unsteered MIMO pilot is received, and (4) the time each steered MIMO pilot is received. This record may be maintained in various formats. For example, the record may contain, for each frame n, four time entries for the four MIMO pilot events. If a MIMO pilot was not transmitted or received in a given frame n, then the time entry for that MEMO pilot for a prior frame n−1 may be copied and stored for frame n. With this record format, in any given frame n, station A may readily determine (1) the time that the latest (or most recent) unsteered MIMO pilot was transmitted, which is denoted as $t_{tx}^u(A \rightarrow B,n)$, (2) the time the latest steered MIMO pilot was transmitted, which is denoted as $t_{tx}^s(A \rightarrow B,n)$, (3) the time the latest unsteered MIMO pilot was received, which is denoted as $t_{rx}^u(A \leftarrow B,n)$, and (4) the time the latest steered MIMO pilot was received, which is denoted as $t_{rx}^s(A \leftarrow B,n)$. Station A may use this information to determine the age and quality of the channel information that is currently available.

Table 2 shows a list of variables used in the description below.

TABLE 2

| Symbol | Description |
| --- | --- |
| $t_{tx}^u(A \rightarrow B, n)$ | The latest time that station A transmits an unsteered MIMO pilot to station B, as determined in frame n. |
| $t_{tx}^s(A \rightarrow B, n)$ | The latest time that station A transmits a steered MIMO pilot to station B, as determined in frame n. |
| $t_{rx}^u(A \leftarrow B, n)$ | The time at which station A receives the latest unsteered MIMO pilot from station B, as determined in frame n. |
| $t_{rx}^s(A \leftarrow B, n)$ | The time at which station A receives the latest steered MIMO pilot from station B, as determined in frame n. |
| $d_{pilot}^u$ | Processing delay for an unsteered MIMO pilot to obtain channel information. |
| $d_{pilot}^s$ | Processing delay for a steered MIMO pilot to obtain channel information. |
| $d_{snr}$ | Processing delay for a MIMO pilot to obtain SNR/rate information. |
| $Th_{age}^{steer}$ | Maximum age to permit use of the channel information. |
| $Th_{age}^{rate}$ | Maximum age to permit use of the SNR/rate information. |
| $SNR(A \leftarrow B, n)$ | Set of SNRs obtained by station A from station B (e.g., derived from initial rate(s) received from station B). |
| $t_{snr}(A \leftarrow B, n)$ | The time at which $SNR(A \leftarrow B, n)$ was obtained by station A. |

Station A may determine the age of the channel information available in the current frame n (or the "current channel information") as follows. If the current channel information is derived from an unsteered MIMO pilot received from station B, then the age of this information is equal to the age of the unsteered MIMO pilot. However, a delay of $d_{pilot}^u$ is incurred to process the unsteered MIMO pilot to obtain the channel information or, equivalently, the channel information is available $d_{pilot}^u$ seconds after receiving the unsteered MIMO pilot. Thus, the latest unsteered MIMO pilot that could have been used to derive the current channel information was received at least $d_{pilot}^u$ seconds earlier and may be identified as follows:

$$\max_i \{[t_{current} - t_{rx}^u(A \leftarrow B, i)] \geq d_{pilot}^u\}. \quad \text{Eq (19)}$$

If the latest unsteered MIMO pilot for the current frame n was received at least $d_{pilot}^u$ seconds earlier, then this unsteered MIMO pilot was used to derive the current channel information. However, if the latest unsteered MIMO pilot for the current frame n was received less than $d_{pilot}^u$ seconds earlier, then this unsteered MIMO pilot was not used to derive the current channel information. Equation (19) determines the most recent frame i in which the latest unsteered MIMO pilot for that frame i could have been used to derive the current channel information. The age of the current channel information derived from the unsteered MIMO pilot may then be expressed as:

$$Age^u = t_{current} - t_{rx}^u(A \leftarrow B, i), \quad \text{Eq (20)}$$

where i is the frame index determined by equation (19); and
$Age^u = -\infty$ if an unsteered MIMO pilot was not received.

If the current channel information is derived from a steered MIMO pilot received from station B, then the age of this information is equal to the age of the corresponding unsteered MIMO pilot from which the steered MIMO pilot is derived. A delay of $d_{pilot}^s$ is incurred by station A to process the steered MIMO pilot received from station B, and a delay of $d_{pilot}^u$ is incurred by station B to process the corresponding unsteered MIMO pilot sent by station A. Thus, the latest unsteered MIMO pilot that could have been used to derive the current channel information was received at least $d_{pilot}^s + d_{pilot}^u$ seconds earlier and may be identified as follows:

$$\max_i \{[t_{current} - t_{rx}^s(A \leftarrow B, i)] \geq d_{pilot}^s\} \quad \text{Eq (21)}$$

AND $$\max_j \{[t_{rx}^s(A \leftarrow B, i) - t_{tx}^u(A \to B, j)] \geq d_{pilot}^u\}.$$

Equation (21) determines the most recent frame j in which the latest unsteered MIMO pilot for that frame j could have been used to derive the current channel information. The age of the current channel information derived from the steered MIMO pilot may then be expressed as:

$$Age^s = t_{current} - t_{tx}^u(A \to B, j) \quad \text{Eq (22)}$$

where j is the frame index determined by equation (21); and
$Age^s = -\infty$ if a steered MIMO pilot was not received.

The age of the current channel information, $Age_{ch\_inf}(n)$, may then be expressed as:

$$Age_{ch\_inf}(n) = \min(Age^u, Age^s). \quad \text{Eq (23)}$$

A transmission mode may then be selected based on the age of the current channel information, as follows:

$$\text{Transmission mode} = \begin{cases} \text{Steered mode} & \text{if } Age_{ch\_inf}(n) \leq Th_{age}^{steer}, \\ \text{Unsteered mode} & \text{if } Age_{ch\_inf}(n) > Th_{age}^{steer}. \end{cases} \quad \text{Eq (24)}$$

The transmission mode may also be selected based on other pertinent information. For example, the time variant nature of the MIMO channel may be considered. If the MIMO channel is relatively static (e.g., for fixed stations A and B), then the channel information may be relatively accurate and valid over a longer time period. Conversely, if the MIMO channel changes fairly rapidly (e.g., for mobile stations A and/or B), then the channel information may be accurate over a shorter time period. The time variant nature of the MIMO channel may be accounted for in the computation of the age of the channel information and/or in the age threshold, $Th_{age}^{steer}$. For example, $Age^u$ and $Age^s$ may be a function of channel type (e.g., fast or slow fading), different age thresholds may be used for different channel types, and so on.

Station A may select the final rate(s) for data transmission to station B based on the age of the underlying MIMO pilot used to derive the initial rate(s). The actual rate(s) supported by the link from stations A to B are dependent on the received SNRs at station B, which may be estimated based on either a steered MIMO pilot or an unsteered MIMO pilot received from station A. The received SNRs may be converted to initial rate(s), which may then be sent back to station A. Station A may estimate the received SNRs at station B based on the initial rate(s) obtained from station B. For example, station A may provide each initial rate to an inverse look-up table, which may then provide the required SNR for the initial rate. The set of SNRs available to station A in the current frame n (or the "current SNR information") is denoted as $SNR(A \leftarrow B, n)$ and is obtained at time $t_{snr}(A \leftarrow B, n)$.

A delay of $d_{snr}$ is incurred in order (1) for station B to process a steered or unsteered MIMO pilot to estimate the received SNRs, derive the initial rate(s), and send the initial rate(s) back to station A and (2) for station A to process the initial rate(s) to obtain the current SNR information. Thus, the latest MIMO pilot that could have been used to obtain the current SNR information was sent by station A at least $d_{snr}$ seconds earlier and may be identified as follows:

$$\left[t_{snr}(A \leftarrow B, n) - \max_k \left\{ \begin{array}{l} t_{tx}^u(A \to B, k), \\ t_{tx}^s(A \to B, k) \end{array} \right\} \right] \geq d_{snr}. \quad \text{Eq (25)}$$

Equation (25) determines the most recent frame k in which the latest steered or unsteered MIMO pilot for that frame k could have been used to derive the current SNR information. The age of the current SNR information may then be expressed as:

$$Age_{snr\_inf}(n) = t_{current} - \max \{t_{tx}^u(A \to B, k), t_{tx}^s(A \to B, k)\}, \quad \text{Eq (26)}$$

where k is the frame index determined by equation (25).

The final rate(s) may be selected based on the current SNR information, the age of the SNR information, and possibly other information. For example, if the age of the current SNR information exceeds an SNR age threshold (or $Age_{snr\_inf}(n) > Th_{age}^{snr}$), then the SNR information may be deemed to be too stale and discarded from use. In this case, the most robust transmission mode and the lowest rate (e.g., the lowest rate in the unsteered mode) may be used for data transmission to station B. If the age of the current SNR information is less than the SNR age threshold, then the SNRs obtained by station A may be adjusted based on the age of the SNR information, and the adjusted SNRs may then be used to select the final rate(s). The SNR adjustment may be performed in various manners.

If the steered mode is selected for use, then station A may receive an initial rate for each eigenmode m, determine the required SNR for each eigenmode based on the initial rate for that eigenmode, and adjust the required SNR for each eigenmode based on the age of the SNR information. For example, an SNR back-off, $SNR_{age\_bo}(n)$, may be computed based on a linear function of age, as follows:

$$SNR_{age\_bo}(n) = \frac{SNR_{adj\_rate}}{Age_{snr\_inf}(n)}, \quad \text{Eq (27)}$$

where $SNR_{adj\_rate}$ is the rate of adjustment for the SNR (e.g., $SNR_{adj\_rate}$=50 dB/sec).
The adjusted SNR for each eigenmode may then be computed as:

$$SNR_{adj.m}^s(n) = SNR_{req.m}(n) - SNR_{age\_bo}(n) - SNR_{bo}^s, \quad \text{Eq (28)}$$

where $SNR_{req.m}(n)$ is the required SNR for eigenmode m (obtained from the initial rate);
$SNR_{bo}^s$ is a back-off for the steered mode (e.g., $SNR_{bo}^s$=0 dB); and
$SNR_{adj.m}^s(n)$ is the adjusted SNR for eigenmode m for the steered mode.

Station A may provide the adjusted SNR for each eigenmode to a look-up table, which then provides the final rate for that eigenmode. Station A may use the same look-up table that station B used to obtain the initial rate for each eigenmode, or a different look-up table.

If the unsteered mode is selected for use, then station A may receive an initial rate for each eigenmode and may determine a single final rate for data transmission in the unsteered mode. An adjusted SNR may be computed for each eigenmode as follows:

$$SNR_{adj.m}^u(n) = SNR_{req.m}(n) - SNR_{age\_bo}(n) - SNR_{bo}^u, \quad \text{Eq (29)}$$

where $SNR_{bo}^u$ is a back-off for the unsteered mode (e.g., $SNR_{bo}^u$=3 dB); and
$SNR_{adj.m}^u(n)$ is the adjusted SNR for eigenmode m for the unsteered mode.

$SNR_{bo}^u$ may be used to account for various factors such as, e.g., the total transmit power being distributed over all $N_S$ spatial channels (even the poor ones), loss in performance due to variation in SNR across each data packet, and so on. $SNR_{bo}^u$, $SNR_{bo}^s$, and $SNR_{adj\_rate}$ may be determined by computer simulation, empirical measurements, and so on.

The number of spatial channels to use for data transmission in the current frame n, $N_{sch}()$, may be determined by counting the number of "good" eigenmodes with adjusted SNRs greater than an SNR threshold, $SNR_{th}$. For each eigenmode m, if $SNR_{adj.m}^u(n) \geq SNR_{th}$, then eigenmode m is counted for $N_{sch}(n)$. The number of spatial channels to use for the unsteered mode is thus less than or equal to the number of eigenmodes, or $N_{sch}(n) \leq N_S$. An average SNR for the unsteered mode, $SNR_{avg}(n)$, may be computed as follows:

$$SNR_{avg}(n) = 10 \log_{10}\left(\frac{N_S}{N_{sch}(n)}\right) + \frac{1}{N_{sch}(n)} \cdot \sum_{m=1}^{N_S} SNR_{adj.m}^u(n). \quad \text{Eq (30)}$$

Station B selects the initial rate for each eigenmode based on an assumption that all $N_S$ eigenmodes are used for data transmission and that equal transmit power is used for all eigenmodes. If less than $N_S$ spatial channels are used for the unsteered mode, then higher transmit power may be used for each selected spatial channel. The first term on the right hand side in equation (30) accounts for the use of higher transmit power for each spatial channel if less than Ns spatial channels are selected for use. The second term on the right hand side in equation (30) is the average SNR (in dB) for the $N_{sch}(n)$ spatial channels selected for use in frame n.

Station A may provide the average SNR to a look-up table, which then provides the final rate for the unsteered mode. Station A may use the same look-up table that station B used to obtain an initial rate for the unsteered mode, or a different look-up table.

Alternatively, station A may receive a single initial rate for the unsteered mode from station B. In this case, station A may determine the required SNR for the unsteered mode based on the initial rate, adjust the required SNR based on the age of the SNR information, and determine the final rate for the unsteered mode based on the adjusted SNR.

For both the steered and unsteered modes, the final rate(s) may also be determined based on other pertinent information such as the time variant nature of the MIMO channel. For example, the SNR back-off, $SNR_{age\_bo}(n)$, and/or the age threshold, $Th_{age}^{rate}$, may be a function of channel type (e.g., fast or slow fading). For simplicity, the SNR back-off was computed based on a linear function of age, as shown in equation (27). In general, the SNR back-off may be any linear or non-linear function of age and/or other parameters.

FIG. 3 shows a flow diagram of a process 300 for selecting a transmission mode for data transmission in a wireless system. Initially, channel information used to transmit data via a wireless channel is obtained (block 312). For a MIMO system, the channel information may comprise eigenvectors used to transmit data on eigenmodes of a MIMO channel and may be obtained from a steered or unsteered MIMO pilot. The age of the channel information is determined (block 314). This may be achieved by determining the age of the (e.g., unsteered MIMO) pilot from which the channel information is derived. A transmission mode is then selected from among multiple supported transmission modes based on the age of the channel information and possibly other information (e.g., the time variant characteristic of the MIMO channel, the capability of the receiving entity, and so on) (block 316). Data is then processed and transmitted via the wireless channel in accordance with the selected transmission mode (block 318).

For clarity, the description above is for an exemplary MIMO system that supports two transmission modes—the steered mode and unsteered mode. In general, the system may support any transmission mode and any number of transmission modes. For example, a system may support a transmission mode in which data is transmitted on orthogonal spatial channels with spatial spreading, a transmission mode in which data is transmitted on orthogonal spatial channels without spatial spreading (the steered mode), a transmission mode in which data is transmitted on spatial channels with spatial spreading (the unsteered mode), a transmission mode in which data is transmitted on spatial channels without spatial spreading, a transmission mode in which data is transmitted on a single best spatial channel without spatial spreading, a transmission mode in which data is transmitted from a single transmit antenna, and so on, or any combination thereof.

FIG. 4 shows a flow diagram of a process 400 for performing rate selection in a wireless system. Initially, channel state information indicative of the received signal quality for a wireless channel used for data transmission is obtained (block 412). The channel state information may be in the form of received SNRs, initial rates, and so on, and may be determined by a receiving entity and sent to a transmitting entity. The age of the channel state information is determined (block 414). This may be achieved by determining the age of the (e.g., steered or unsteered MIMO) pilot from which the channel state information is derived. One or more final rates are then selected based on the channel state information, the age of the channel state information, and possibly other information (block 416). For example, the final rate(s) may be determined based on the transmission mode selected for use (e.g., steered or unsteered mode), a back-off factor that is dependent on the age of the channel state information (e.g., $SNR_{age\_bo}(n)$), a back-off factor that is dependent on the selected transmission mode (e.g., $SNR_{bis}$ or $SNR_{bo}^u$), the time variant characteristic of the wireless channel, and so on. Data is then processed and transmitted via the wireless channel in accordance with the selected final rate(s) (block 418).

The techniques described herein select a transmission mode and final rate(s) for data transmission based on the most current information available at the transmitting station A and the age of this information. The channel information used for transmission mode selection and the channel state information used for rate selection may be derived from the same or different MIMO pilots. Different transmission modes and rates may be selected for different frames based on the same information due to the aging of the information and possibly other factors.

As noted above, the transmission mode and rate selection techniques may be used for a multi-carrier MIMO system. Multiple carriers may be provided by orthogonal frequency division multiplexing (OFDM) or some other constructs. OFDM effectively partitions the overall system bandwidth into multiple ($N_F$) orthogonal subbands, which are also referred to as tones, subcarriers, bins, and frequency channels. With OFDM, each subband is associated with a respective subcarrier that may be modulated with data. For a MIMO system that utilizes OFDM, spatial processing may be performed on each of the subbands used for data transmission.

For the steered mode, a channel response matrix H(k,i) may be obtained for each subband k in symbol period i and decomposed to obtain the $N_S$ eigenmodes of that subband. The singular values in each diagonal matrix $\Sigma(k,i)$, for k= 1 ... $N_F$. may be ordered such that the first column contains the largest singular value, the second column contains the next largest singular value, and so on, or $\sigma_1(k,i) \geq \sigma_2(k,i) \geq \ldots \geq \sigma_{N_S}(k,i)$, where $\sigma_m(k,i)$ is the singular value in the m-th column of $\Sigma(k,i)$ after the ordering. When the singular values for each matrix $\Sigma(k,i)$ are ordered, the eigenvectors (or columns) of the associated matrices V(k,i) and U(k,i) for that subband are also ordered correspondingly. A "wideband" eigenmode may be defined as the set of same-order eigenmode of all $N_F$ subbands after the ordering. The m-th wideband eigenmode thus includes the m-th eigenmode of all subbands. Each wideband eigenmode is associated with a respective set of $N_F$ eigenvectors for the $N_F$ subbands. The transmission mode and rate selection may then be performed for the $N_S$ wideband eigenmodes, e.g., similar to that described above for a single-carrier MIMO system.

Figure 5:
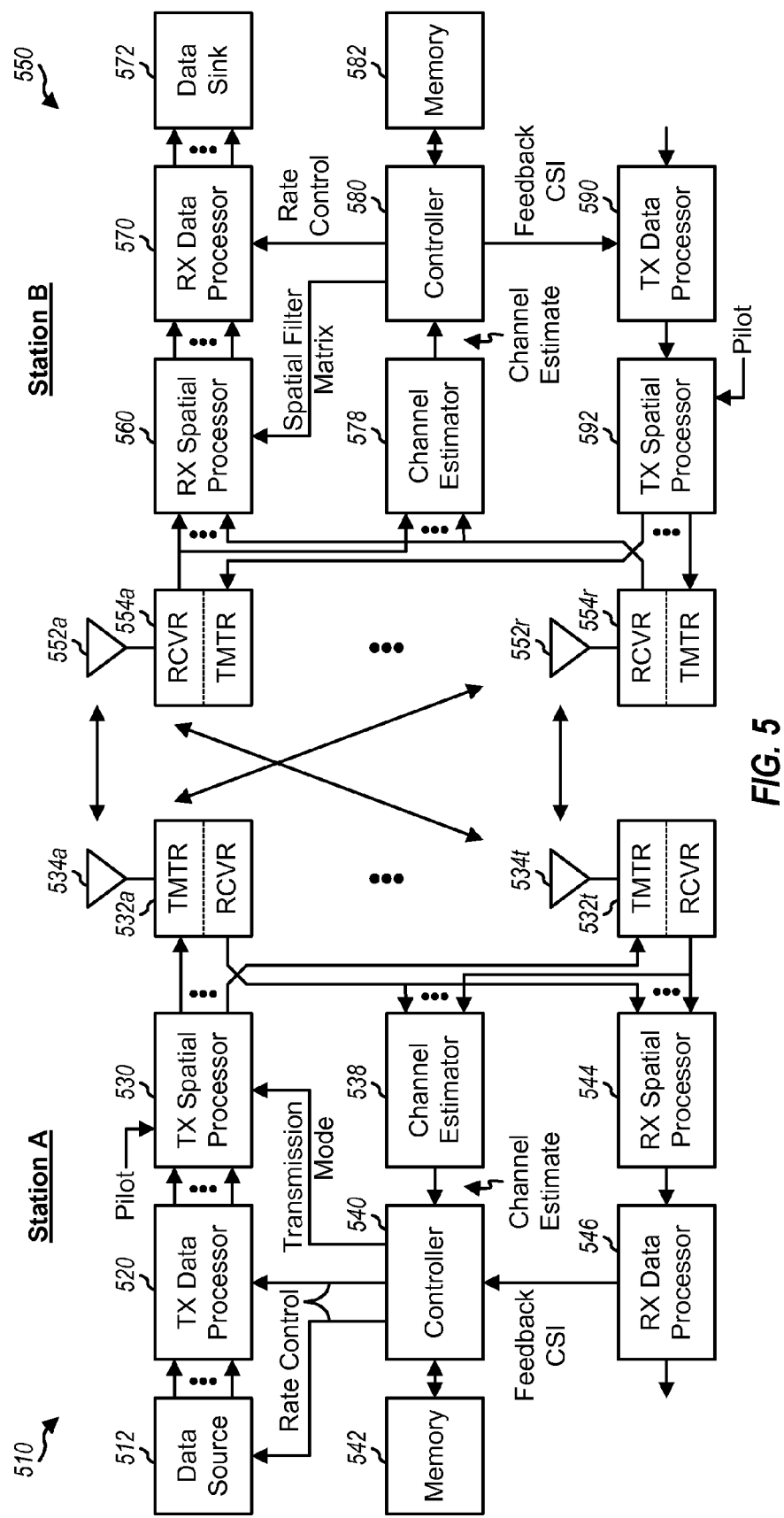
FIG. 5 shows a block diagram of stations A and B.

FIG. 5 shows a block diagram of transmitting station A 510 and receiving station B 550. At station A 510, a transmit (TX) data processor 520 receives traffic data from a data source 512, processes (e.g., formats, codes, interleaves, and modulates) the traffic data, and provides data symbols. For the steered mode, one data stream may be sent on each eigenmode, and each data stream may be encoded and modulated based on a final rate selected for that stream/eigenmode. For the unsteered mode, multiple data streams may be sent on multiple spatial channels, and one final rate may be used for all streams. A TX spatial processor 530 performs spatial processing on the data symbols and pilot symbols for the selected transmission mode and provides $N_T$ streams of transmit symbols to $N_T$ transmitter units (TMTR) 532a through 532t. Each transmitter unit 532 receives and conditions a respective transmit symbol stream to generate a corresponding modulated signal. $N_T$ modulated signals from transmitter units 532a through 532t are transmitted from $N_T$ antennas 534a through 534t, respectively.

At station B 550, $N_R$ antennas 552a through 552r receive the modulated signals transmitted by station A, and each antenna provides a received signal to a respective receiver unit (RCVR) 554. Each receiver unit 554 performs processing complementary to that performed by transmitter units 532 and provides received symbols. A receive (RX) spatial processor 560 performs spatial matched filtering on the received symbols from all $N_R$ receiver units 554 based on a spatial filter matrix M(n) and provides detected data symbols. The matrix M(n) is derived based on the selected transmission mode and the receiver processing technique selected for use (e.g., full-CSI, MMSE, or CCMI). An RX data processor 570 processes (e.g., symbol demaps, deinterleaves, and decodes) the detected data symbols and provides decoded data for station B.

Channel estimators 538 and 578 perform channel estimation for stations A and B, respectively. Controllers 540 and 580 control the operation of various processing units at stations A and B, respectively. Memory units 542 and 582 store data and program codes used by controllers 540 and 580, respectively.

For transmission mode and rate selection, channel estimator 578 may estimate the channel response for the MIMO channel from station A to station B and the received SNRs for the spatial channels of the MIMO channel. Controller 580 may determine initial rate(s) based on the received SNRs and provide feedback CSI, which may comprise the initial rate(s). The feedback CSI is processed by a TX data processor 590 and further multiplexed with pilot symbols and spatially processed for the steered or unsteered mode by a TX spatial processor 592 to generate $N_R$ transmit symbol streams. $N_R$ transmitter units 554a through 554r then condition the $N_R$ transmit symbol streams to generate $N_R$ modulated signals, which are sent via $N_R$ antennas 552a through 552r.

At station A 510, the modulated signals from station B are received by $N_T$ antennas 534 and processed by $N_T$ receiver units 532 to obtain received symbols for station B. The received symbols are further processed by an RX spatial processor 544 and an RX data processor 546 to obtain the feedback CSI from station B. Controller 540 receives the feedback CSI, selects the transmission mode and final rate(s) to use for. data transmission to station B, provides a rate control to data source 512 and TX data processor 520, and provides the selected transmission mode and channel information (e.g., eigenvectors) to TX spatial processor 530.

The transmission mode and rate selection techniques described herein may be implemented by various means. For example, these techniques may be implemented in hardware, software, or a combination thereof. For a hardware implementation, the processing units used to perform transmission mode and rate selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmission mode and rate selection techniques may be implemented with modules (e.g., procedures, functions, and so on) that perform the functions described herein. The software codes may be stored in a memory unit (e.g., memory unit 542 and/or 582 in FIG. 5) and executed by a processor (e.g., controller 540 and/or 580). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of selecting a transmission mode for data transmission in a wireless communication system, comprising: determining the age of channel information available for use to transmit data via a wireless channel; comparing the age of the channel information against a threshold, and selecting a steered mode when the age of the channel information is less than or equal to the threshold and selecting an unsteered mode when the age of the channel information is greater than the threshold; and processing data in accordance with the selected transmission mode wherein the channel information is used for processing when the steered mode is selected and the channel information is not used for processing when the unsteered mode is selected.

2. The method of claim 1, further comprising:
obtaining eigenvectors used to transmit data on a plurality of orthogonal spatial channels of a multiple-input multiple-output (MIMO) channel, wherein the channel information comprises the eigenvectors.

3. The method of claim 1, further comprising:
determining the age of a pilot used to derive the channel information, wherein the age of the channel information is determined based on the age of the pilot.

4. The method of claim 1, further comprising:
determining the threshold based on a function of a time variant characteristic of the wireless channel.

5. An apparatus in a wireless communication system, comprising: a controller to determine the age of channel information available for use to transmit data via a wireless channel, compares the age of the channel information against a threshold, and selects a steered mode when the age of the channel information is less than or equal to the threshold and selects an unsteered mode when the age of the channel information is greater than the threshold; and to select a transmission mode from among a plurality of transmission modes based on the age of the channel information; and a spatial processor to spatially process data in accordance with the selected transmission mode wherein the spatial processor uses the channel information for spatial processing when the steered mode is selected and the spatial processor does not use the channel information for spatial processing when the unsteered mode is selected.

6. The apparatus of claim 5, wherein the controller determines the age of a pilot used to derive the channel information and determines the age of the channel information based on the age of the pilot.

7. An apparatus in a wireless communication system, comprising: means for determining the age of channel information available for use to transmit data via a wireless channel; means for comparing the age of the channel information against a threshold, and selecting a steered mode when the age of the channel information is less than or equal to the threshold and selecting an unsteered mode when the age of the channel information is greater than the threshold; and means for processing data in accordance with the selected transmission mode wherein the channel information is used for processing when the steered mode is selected and the channel information is not used for processing when the unsteered mode is selected.

8. The apparatus of claim 7, further comprising:
means for determining the age of a pilot used to derive the channel information, wherein the age of the channel information is determined based on the age of the pilot.

9. A computer program product, comprising: a non-transitory computer-readable medium comprising code for causing a computer to: determine the age of channel information available for use to transmit data via a wireless channel; compare the age of the channel information against a threshold, and select a steered mode when the age of the channel information is less than or equal to the threshold and select an unsteered mode when the age of the channel information is greater than the threshold; and process data in accordance with the selected transmission mode wherein the channel information is used for processing when the steered mode is selected and the channel information is not used for processing when the unsteered mode is selected.

10. The computer program product of claim 9, wherein the computer-readable medium further comprises code for causing the computer to determine the age of a pilot used to derive the channel information, wherein the age of the channel information is determined based on the age of the pilot.

* * * * *